United States Patent
Lee et al.

(10) Patent No.: US 11,186,492 B2
(45) Date of Patent: Nov. 30, 2021

(54) METHOD FOR RECOVERING VALUABLE METAL SULFIDES

(71) Applicant: KOREA RESOURCES CORPORATION, Wonju-si (KR)

(72) Inventors: Seung Ho Lee, Ansan-si (KR); Jeon Woong An, Wonju-si (KR); Youn Kyu Yi, Wonju-si (KR)

(73) Assignee: KOREA RESOURCES CORPORATION, Wonju-si (KR)

( * ) Notice: Subject to any disclaimer, the term of this patent is extended or adjusted under 35 U.S.C. 154(b) by 0 days.

(21) Appl. No.: 16/292,919

(22) Filed: Mar. 5, 2019

(65) Prior Publication Data

US 2020/0283305 A1 Sep. 10, 2020

(51) Int. Cl.
| | | |
|---|---|---|
| *C01G 9/08* | (2006.01) | |
| *C01G 51/00* | (2006.01) | |
| *C22B 3/08* | (2006.01) | |

(52) U.S. Cl.
CPC ............... *C01G 9/08* (2013.01); *C01G 51/30* (2013.01); *C22B 3/08* (2013.01)

(58) Field of Classification Search
CPC ............... C01G 9/08; C01G 51/30; C22B 3/08
See application file for complete search history.

(56) References Cited

U.S. PATENT DOCUMENTS

| | | | | |
|---|---|---|---|---|
| 3,196,005 A | * | 7/1965 | Moore | C22B 23/0461 |
| | | | | 423/142 |
| 3,867,268 A | * | 2/1975 | Kawulka | C22B 19/22 |
| | | | | 205/608 |
| 3,991,159 A | * | 11/1976 | Queneau | C22B 23/043 |
| | | | | 423/150.4 |
| 4,024,218 A | * | 5/1977 | McKay | B03B 1/02 |
| | | | | 423/26 |
| 8,518,232 B1 | * | 8/2013 | Harrison | C25C 1/16 |
| | | | | 205/539 |
| 2006/0228279 A1 | * | 10/2006 | Campbell | C22B 3/0005 |
| | | | | 423/150.1 |
| 2008/0274026 A1 | * | 11/2008 | Choi | C01G 3/12 |
| | | | | 423/43 |
| 2010/0135878 A1 | * | 6/2010 | Shibayama | C22B 3/08 |
| | | | | 423/150.1 |

(Continued)

FOREIGN PATENT DOCUMENTS

| | | | |
|---|---|---|---|
| CA | 618826 | * | 4/1958 |
| CA | 618826 | * | 4/1961 |

(Continued)

OTHER PUBLICATIONS

Zhu et al. [Hydrometallurgy 127-128 2012 1-7] (Year: 2012).*

(Continued)

*Primary Examiner* — Colin W. Slifka
(74) *Attorney, Agent, or Firm* — Cantor Colburn LLP

(57) ABSTRACT

Provided is a method for recovering a valuable metal sulfide, the method including: (a) adding limestone to a residual solution including a valuable metal to remove iron and aluminum; (b) adding sulfuric acid and a sulfide to the solution from which the iron and aluminum are removed to recover the valuable metal sulfide; and (c) adding air or sulfuric acid to the solution from which the valuable metal sulfide is recovered to remove sulfur.

15 Claims, 3 Drawing Sheets

(56) References Cited

U.S. PATENT DOCUMENTS

2012/0186398 A1* 7/2012 Dreisinger ............ C22B 23/043
75/743
2018/0105896 A1* 4/2018 Yoneyama ............ C01B 17/165

FOREIGN PATENT DOCUMENTS

KR 101107010 1/2012
KR 101461733 11/2014

OTHER PUBLICATIONS

Dreisinger [ Hydrometallurgy Conference, 2009, The South African Institute of Mining and Metallurgy, Keynote address (Year: 2009).*
Park et al. [Hydrometallurgy 174 2017 227-233 (Year: 2017).*
Cheng et al. [Chinese Journal of Chemical Engineering 24 (2016) 237-248] (Year: 2016).*
PubChem [PubChem listing of Sulfuric Acid Boiling Point, compiled from 1998 EPA data] (Year: 1998).*

* cited by examiner

METHOD FOR RECOVERING VALUABLE METAL SULFIDES

BACKGROUND OF THE INVENTION

1. Field of the Invention

The present invention relates to a method for recovering a valuable metal sulfide and more particularly to a method for selectively recovering a valuable metal sulfide of cobalt and zinc from manganese, which is a major impurity included in a Raffinate (residual solution) after copper solvent extraction in a Boleo process and for removing hydrogen sulfide included in a remaining solution.

2. Description of the Related Art

Cobalt/zinc solvent extract (synergistic solvent extraction, hereinafter, referred as to "DSX") process is a process of simultaneously extracting cobalt and zinc using two extractants in which the soda ash ($Na_2CO_3$) is added to adjust the optimum pH, thereby increasing the extraction rate.

During the operation of work, the extraction efficiency is lowered due to the degradation of the extractants, and there is an economic problem that the solvent must be continuously supplied in an amount of the degraded extractant.

Further, the soda ash added by the aforementioned method adjusts the pH to increase the extraction rate, but it reacts with cobalt or manganese to precipitate into cobalt carbonate ($CoCO_3$) or manganese carbonate ($MnCO_3$), thereby reducing the extraction rate and resulting in the extractant degradation so that it is difficult to recover cobalt.

Further, as a method for precipitating valuable metals such as cobalt and zinc, soda ash and caustic soda may be used to adjust the pH and to precipitate valuable metals, but manganese, which is a major impurity, is not selectively separated and precipitated with other valuable metals so that it is difficult to recover valuable metals such as cobalt and zinc.

Korean Patent No. 10-1107010 discloses a method for precipitating valuable metals by leaching with sulfuric acid. However, the method suggests nickel, vanadium and molybdenum as metal types which are different from cobalt and zinc of the present invention. Further, the method differs from the present invention which employs a method of leaching in a combination of valuable metals and sulfuric acid.

Further, Korean Patent No. 10-1461733 relates to a step of removing iron ions using alkali, which is different from the method of removing the iron using limestone of the present invention.

SUMMARY OF THE INVENTION

An object of the present invention is to provide a novel method which is capable of selectively recovering a valuable metal sulfide of cobalt and zinc from manganese, which is a major impurity included in a Raffinate after the copper solvent extraction and removing sulfur included in a remaining solution.

In order to address the issues as described above, the present invention provides a method for recovering a valuable metal sulfide, the method including: (a) adding limestone to a residual solution including a valuable metal to remove iron and aluminum; and (b) adding sulfuric acid and a sulfide to the solution from which the iron and aluminum are removed to recover the valuable metal sulfide.

Further, the present invention provides a method for recovering a valuable metal sulfide, the method further including (c) adding air or sulfuric acid to the solution from which the valuable metal sulfide is recovered to remove sulfur.

Further, the present invention provides a method for recovering a valuable metal sulfide, in which the residual solution including the valuable metal includes cobalt (Co) and zinc (Zn), further includes iron (Fe), aluminum (Al) and manganese (Mn), and includes at least one selected from the group consisting of cadmium (Cd), copper (Cu), iron (Fe), potassium (K), magnesium (Mg), calcium (Ca), sodium (Na), aluminum (Al), and nickel (Ni).

Further, the present invention provides a method for recovering a valuable metal sulfide, in which step (a) includes: adding the limestone at a pulp density of 20% by weight to 30% by weight so as to be pH 4 to 6 and allowing the reaction at a temperature of 35° C. to 50° C. for 0.5 hours to 4 hours.

Further, the present invention provides a method for recovering a valuable metal sulfide, in which step (a) is characterized in that the iron is precipitated in a solid state of $Fe_2(SO_4)_3$ or $Fe(OH)_3$ and the aluminum is precipitated in a solid state of $Al(OH)_3$, and in which step (a) is capable of being added several times.

Further, the present invention provides a method for recovering a valuable metal sulfide, in which step (b) is characterized in that the sulfuric acid is added to allow the pH of the solution to be 3 to 6, and then the sulfide is added, in which the sulfide includes at least one of sodium sulfide ($Na_2S$), sodium hydrogen sulfide (NaHS) and hydrogen sulfide ($H_2S$), and in which the sulfide is added in an amount of 2 times to 10 times than the total molar amount of the valuable metal.

Further, the present invention provides a method for recovering a valuable metal sulfide, in which the valuable metal sulfide is cobalt sulfide (CoS) or zinc sulfide (ZnS) in a precipitated state.

Further, the present invention provides a method for recovering a valuable metal sulfide, in which step (b) is consecutively repeated two or more times.

Further, the present invention provides a method for recovering a valuable metal sulfide, in which the sulfur removed in step (c) is in the form of hydrogen sulfide ($H_2S$).

The present invention may provide a method for recovering a valuable metal sulfide and more particularly to a method for recovering valuable metal sulfides from a Raffinate after copper solvent extraction in a Boleo process and the recovered valuable metal sulfide.

DETAILED DESCRIPTION OF THE PREFERRED EMBODIMENT

Hereinafter, exemplary embodiments of the present invention will be described in detail with reference to the accompanying drawings, which will be readily apparent to those skilled in the art to which the present invention pertains. The present invention may be embodied in many different forms and is not limited to the embodiments described herein.

Figure 1:
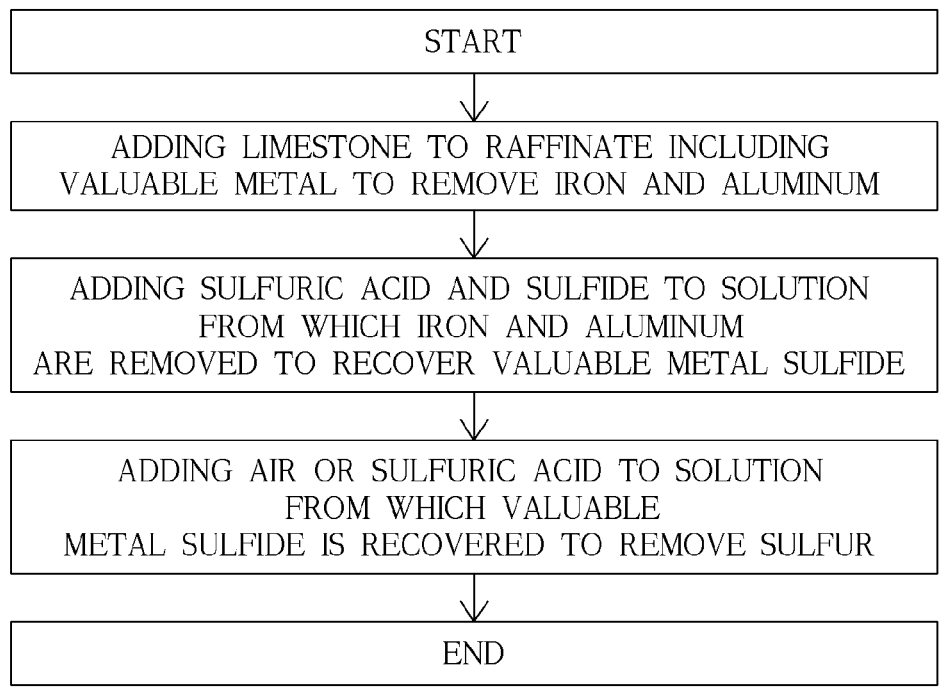
FIG. 1 is a flowchart illustrating a method for recovering a valuable metal sulfide according to one embodiment of the present invention.

FIG. 1 is a flowchart illustrating a method for recovering a valuable metal sulfide according to one embodiment of the present invention.

Referring to FIG. 1, the method for recovering a valuable metal sulfide according the present invention includes: (a) adding limestone to a residual solution including a valuable metal to remove iron and aluminum; (b) adding sulfuric acid and a sulfide to the solution from which the iron and aluminum are removed to recover the valuable metal sulfide; and (c) adding air or sulfuric acid to the solution from which the valuable metal sulfide is recovered to remove sulfur.

In step (a), for example, the valuable metal included in the Raffinate including the valuable metal after the copper solvent extraction may include cobalt, zinc, and the like. The content of cobalt among the valuable metal in the Raffinate after the copper solvent extraction is about 100 ppm to about 300 ppm, and the content of zinc is about 500 ppm to about 1,000 ppm. However, since they exist together with other impurities, they may be worthless.

The Raffinate after the copper solvent extraction includes at least one impurity selected from the group consisting of manganese (Mn), cadmium (Cd), copper (Cu), iron (Fe), potassium (K), magnesium (Mg), calcium (Ca), sodium (Na), aluminum (Al), nickel (Ni) and the like. In step (a), the limestone is added to the Raffinate after the copper solvent extraction.

In step (a), to remove iron and aluminum, the limestone may be added to the residual solution including the valuable metal at a pulp density of 20% by weight to 30% by weight, preferably 25% by weight so as to allow the residual solution to have pH 4 or more, preferably pH 4.5 to pH 6, more preferably pH 5.5.

After the limestone is added, the temperature of the solution is adjusted to 30° C. to 60° C., preferably 35° C. to 50° C., and more preferably about 40° C., thereby allowing the reaction for 0.5 hours to 4 hours, preferably 1.5 hours to 3.5 hours, and more preferably about 3 hours.

By the adjusted pH, the iron may be removed in the form of $Fe_2(SO_4)_3$ or $Fe(OH)_3$, and aluminum may be removed in the form of $Al(OH)_3$.

The aforementioned reaction is carried out in accordance with the following reaction formulas so that the iron and aluminum in the Raffinate after the copper solvent extraction can be removed.

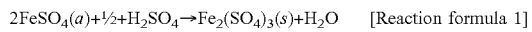
$2FeSO_4(a)+\frac{1}{2}H_2SO_4 \rightarrow Fe_2(SO_4)_3(s)+H_2O$  [Reaction formula 1]

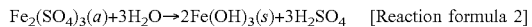
$Fe_2(SO_4)_3(a)+3H_2O \rightarrow 2Fe(OH)_3(s)+3H_2SO_4$  [Reaction formula 2]

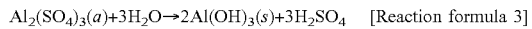
$Al_2(SO_4)_3(a)+3H_2O \rightarrow 2Al(OH)_3(s)+3H_2SO_4$  [Reaction formula 3]

In step (a), if the iron and aluminum are removed according to the reaction formula, step (a) may be repeated several times. Thereafter, the slurry including the precipitated iron and aluminum may be discarded, and the remaining solution may be recovered after the removal of the iron and aluminum.

However, after the iron and aluminum are removed, the solution may further include impurities such as manganese (Mn), cadmium (Cd), copper (Cu), potassium (K), magnesium (Mg), calcium (Ca), sodium (Na) and nickel (Ni).

Accordingly, in the present invention, step (b) is performed in which a sulfide is added to the remaining solution including the valuable metal after step (a) to selectively precipitate the valuable metal.

A feature of the process is that it is capable of selectively recovering valuable metal sulfides of cobalt and zinc from manganese, a major impurity.

In other words, the iron and aluminum are removed in the remaining solution including the valuable metal after step (a), and the solution includes the valuable metals such as cobalt (Co) and zinc (Zn) and impurities such as manganese (Mn), cadmium (Cd), copper (Cu), potassium (K), magnesium (Mg), calcium (Ca), sodium (Na) and nickel (Ni). Therefore, to selectively separate the valuable metals and impurities, sulfuric acid and a sulfide may be added so that they are precipitated in the form of sulfide to be recovered.

Therefore, the sulfuric acid is added to the remaining solution including the valuable metal after step (a). The sulfuric acid may be added to the solution so as to have pH 3 to pH 6, preferably pH 4 to pH 5. After the sulfuric acid is added and reacted, the sulfide is added sequentially.

The sulfide may include at least one of sodium sulfide ($Na_2S$), sodium hydrogen sulfide (NaHS), and hydrogen sulfide ($H_2S$). The sulfide is added in a ratio of 2 times to 20 times, preferably 2 times to 10 times, more preferably 2 times to 5 times than the total molar amount of the valuable metal included in the remaining solution after step (a).

The sulfide may be added to the solution from which the iron and aluminum are removed to allow the reaction for about 1 minute to 60 minutes, preferably 3 minutes to 30 minutes, more preferably 5 minutes to 20 minutes.

During the reaction by adding the sulfide, the pH of the solution is maintained at a pH of 4 to 6 by the sulfuric acid. The cobalt (Co) and zinc (Zn) which are the valuable metals may be precipitated in the form of sulfide (CoS, ZnS).

The reaction is carried out according to the following reaction formulas, and the valuable metal sulfide may be recovered.

$2CoSO_4(aq)+2NaHS \rightarrow Na_2SO_4(aq)+2CoS(S)+H_2SO_4$  [Reaction formula 4]

$2ZnSO_4(aq)+2NaHS \rightarrow Na_2SO_4(aq)+2ZnS(S)+H_2SO_4$  [Reaction formula 5]

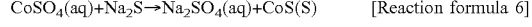
$CoSO_4(aq)+Na_2S \rightarrow Na_2SO_4(aq)+CoS(S)$  [Reaction formula 6]

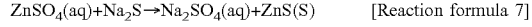
$ZnSO_4(aq)+Na_2S \rightarrow Na_2SO_4(aq)+ZnS(S)$  [Reaction formula 7]

Through step (b), the sulfide slurry in which the valuable metal is precipitated in the form of sulfide may be recovered.

Step (b) may further include a step of performing a second solid-liquid separation after precipitating the sulfide. The additional process can recover the sulfide slurry in which the valuable metal is precipitated in the form of sulfide.

The remaining solution including the impurities other than iron and aluminum after recovering the valuable metal may be impurities such as sulfur (S), manganese (Mn), magnesium (Mg), calcium (Ca), sodium (Na) and nickel (Ni).

The present invention further includes, after step (b), (c) adding air or sulfuric acid to the remaining solution from which the valuable metal is recovered to remove sulfur, an impurity.

In step (c), after step (b), the remaining solution from which the valuable metal is recovered may include impurities such as sulfur (S), manganese (Mn), magnesium (Mg), calcium (Ca), sodium (Na) and nickel (Ni). Since sulfur (S) must be removed from the impurities, air or sulfuric acid is added thereto to remove sulfur (S) in the form of hydrogen sulfide gas.

Therefore, in order to remove the sulfur, air or sulfuric acid is added to the remaining solution from which the valuable metal is recovered after step (b). For the aeration, the air may be added at a rate of about 1 Nm$^3$/Hr to about 6 Nm$^3$/Hr, preferably about 1.5 Nm$^3$/Hr to about 4 Nm$^3$/Hr, and more preferably about 2 Nm$^3$/Hr to about 3 Nm$^3$/Hr per 1 m$^3$ of the solution from which the valuable metal is recovered.

By the added air, the sulfur included as impurities in the solution from which the valuable metal is recovered may be removed in the form of H$_2$S gas. Further, the sulfuric acid may be added to the solution from which the valuable metal is recovered so as to have pH 1 to pH 3, more preferably pH 1.5 to pH 2. By the adjusted pH, the sulfur may be removed in the form of H$_2$S gas. The reaction of pH regulation may be performed according to the following reaction formulas. The sulfur may be removed from the remaining solution after recovery of the valuable metal.

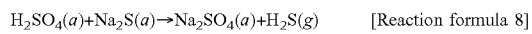

$H_2SO_4(a)+Na_2S(a) \rightarrow Na_2SO_4(a)+H_2S(g)$    [Reaction formula 8]

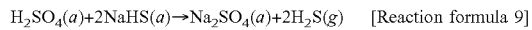

$H_2SO_4(a)+2NaHS(a) \rightarrow Na_2SO_4(a)+2H_2S(g)$    [Reaction formula 9]

In conclusion, in step (c), a solution in which sulfur is removed can be recovered by the reaction formulas.

Further, the present invention can provide a valuable metal sulfide recovered by the above-described method for recovering the valuable metal sulfide.

As described above, the features and other advantages of the present invention will become more apparent from the following Examples, and the following Examples are for illustrative purposes only and can not be construed as limiting or restricting the protective scope of the present invention.

Experimental Example: Recovery of Valuable Metal Sulfide

After the copper solvent extraction, 1 L of the Raffinate was prepared. The components of the Raffinate are shown in Table 1 below.

TABLE 1

| Compound | Conc. (mg/L) |
|---|---|
| Al | 1512 |
| Co | 119 |
| Cu | 88 |
| Fe | 1406 |
| Mn | 5910 |
| Zn | 532 |
| pH | 1.34 |

Limestone having a pulp density of 25% was added thereto so as to adjust the pH to 5 to 5.5 and they were reacted at a temperature of 40° C. for 3 hours. As a result, the iron was precipitated in the form of Fe$_2$(SO$_4$)$_3$ or Fe(OH)$_3$, and the aluminum was precipitated in the form of Al(OH)$_3$.

After the iron and aluminum were precipitated, the slurry was discarded through the first solid-liquid separation. The solution from which the iron and aluminum were largely removed was recovered. However, there may be some residues, but it is less than the initial content. The concentration of calcium (Ca) is influenced by the addition of limestone (CaCO$_3$).

The components of the solution are shown in Table 2 below.

TABLE 2

| Compound | Conc. (mg/L) |
|---|---|
| Al | 3.60 |
| Ca | 541 |
| Co | 75 |
| Cu | 1.99 |
| Fe | 0.14 |
| Mn | 5001 |
| Zn | 345 |

The solution included valuable metals such as cobalt and zinc and at least one impurity of manganese, cadmium, copper, potassium, magnesium, calcium, sodium and nickel in addition to the remaining iron and aluminum. Thus, 1 L of the solution was prepared in order to selectively separate the impurities and the valuable metals. 1 M sulfuric acid was prepared and added to the solution so as to allow the solution to have pH 4 to pH 5.5.

In order to precipitate valuable metals in the pH-adjusted solution, a sulfide (Na$_2$S, NaHS) was added to seawater in an amount of 3 times to 10 times than the total molar amount of the valuable metal so that 2M dissolved sulfide was prepared.

The sulfide dissolved in the seawater was added thereto, and the solution was reacted for 5 minutes to 20 minutes. During the reaction, the solution was adjusted to have pH 4.5 to pH 5.5 using sulfuric acid. After CoS and ZnS, valuable metal sulfides, were precipitated, the cobalt sulfide (CoS) and zinc sulfide (ZnS) were finally recovered through further solid-liquid separation, and the valuable metal-recovered remaining solution was recovered.

Figure 2:
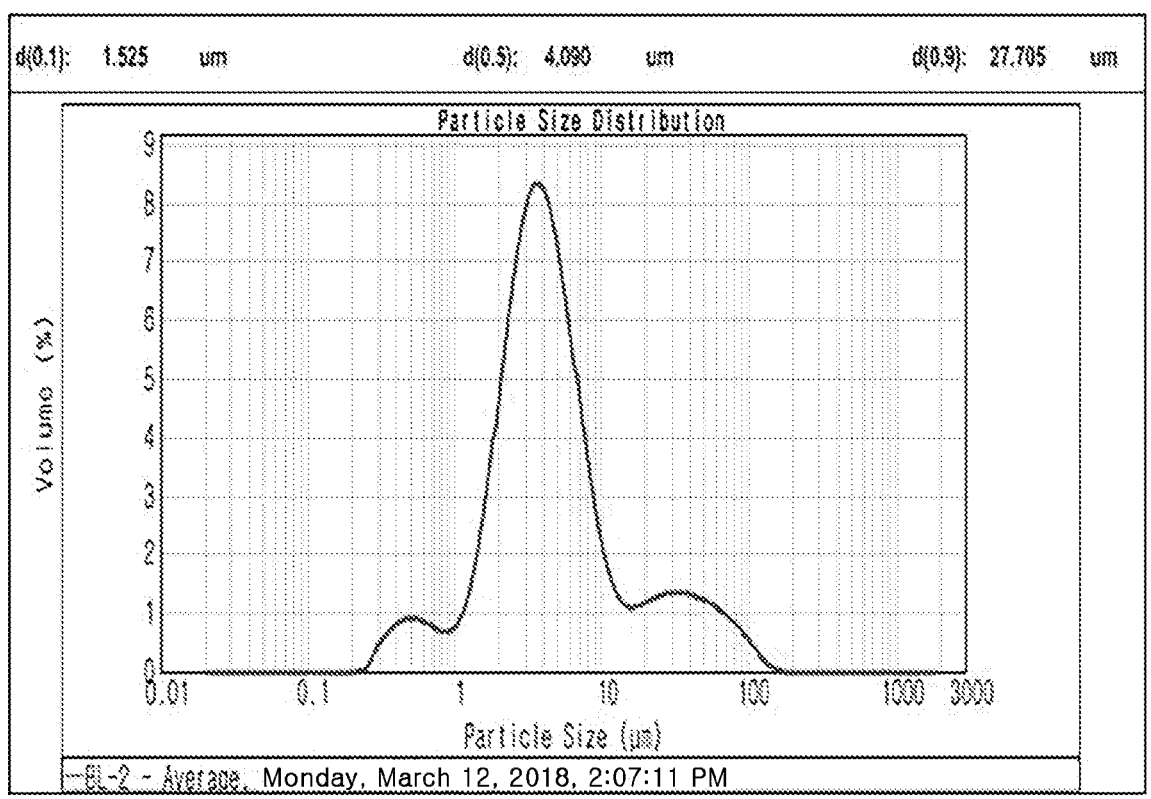
FIG. 2 illustrates the particle size of the valuable metal sulfide produced according to one embodiment of the present invention.

FIG. 2 is a graph analyzing a particle size of the valuable metal sulfide produced according to an embodiment of the present invention. As an analysis result of the particle size of the recovered product, the average particle size (d 0.5) was about 4.09 μm.

Figure 3:
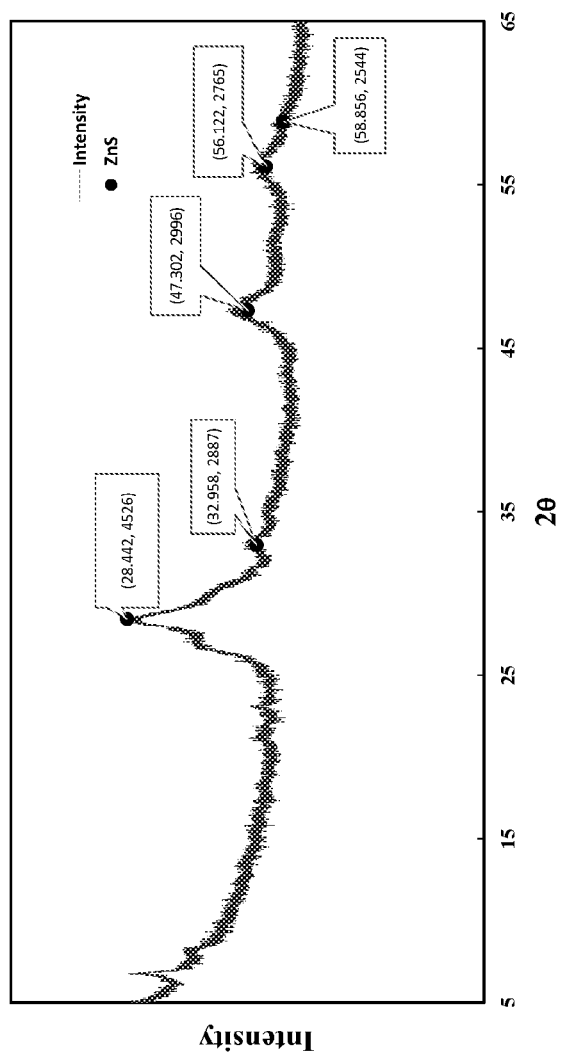
FIG. 3 illustrates the XRD analysis result of the valuable metal sulfide produced according to one embodiment of the present invention.

FIG. 3 illustrates a result of XRD analysis of the valuable metal sulfide produced according to an embodiment of the present invention, confirming that it has been precipitated as the expected sulfide crystal structure.

The recovered cobalt sulfide and zinc sulfide were analyzed, and the yield and recovery ratio are as shown in Table 3 below.

TABLE 3

| Compound | Yield (mg/L) | Recovery ratio (%) |
|---|---|---|
| Co | 68.02 | 90.69 |
| Zn | 289.23 | 83.83 |

The present invention can add a step of removing sulfur from the solution from which the valuable metal sulfide is recovered. Air or sulfuric acid is added to remove sulfur.

In order to remove sulfur, which is an impurity, from 0.7 L of the remaining solution from which the valuable metal is recovered, the reaction was carried out for 30 minutes while the air was added to the remaining solution at a rate of 2 Nm$^3$/Hr to 3 Nm$^3$/Hr per 1 m$^3$ of the solution. While the solution reacted for 30 minutes was reacted with 0.4 L of the supernatant of cell division control protein CCD6 including the valuable metal in the Boleo process, the elimination of sulfur was checked based on whether the valuable metal was precipitated. In order to remove sulfur, which is an impurity, from 0.7 L of the remaining solution from which the valuable metal is recovered, the sulfuric acid was added to the remaining solution, and the solution was reacted to adjust the pH to 5 to 5.5. While the pH-adjusted solution was reacted with 0.4 L of the supernatant of cell division control protein CCD6 including the valuable metal in the Boleo process, the elimination of sulfur was checked based on whether the valuable metal was precipitated.

Although the experimental examples of the present invention have been described, those skilled in the art will appreciate that the experimental examples can be modified without departing from the principle and spirit of the present invention. The scope of the invention will be determined by the appended claims and their equivalents.

What is claimed is:

1. A method for recovering a valuable metal sulfide, the method comprising:
    (a) removing iron and aluminum from a residual solution including a valuable metal by adding limestone to the residual solution, wherein the residual solution comprises cobalt and zinc, and wherein the residual solution including the valuable metal further includes impurities of copper and manganese;
    (b) recovering the valuable metal sulfide by adding sulfuric acid and sulfide to the residual solution from which the iron and the aluminum are removed; and
    (c) removing sulfur from the residual solution from which the valuable metal sulfide is recovered by adding sulfuric acid to the residual solution from which the valuable metal sulfide is recovered,
    wherein step (a) includes
        adding the limestone at a pulp density of 20% by weight to 30% by weight so as to have a pH of 5 to 6,
        removing the iron and aluminum at a temperature of 35° C. to 50° C. for 0.5 hours to 4 hours, and
        precipitating the iron in a solid state of $Fe_2(SO_4)_3$ and precipitating the aluminum in a solid state of $Al(OH)_3$,
    wherein the sulfide includes sodium sulfide ($Na_2S$) and sodium hydrogen sulfide (NaHS) added to seawater in an amount of 3 times to 10 times a total molar amount of the valuable metal so as to have a concentration of 2M dissolved sulfide,
    wherein the valuable metal sulfide comprises zinc sulfide (ZnS) in a precipitated state, and an average particle size (d 0.5) of the zinc sulfide (ZnS) is about 4.09 µm, and
    wherein step (b) comprises adding the sulfuric acid so as to have a pH of the solution be 4 to 5.5, and then adding the sulfide.

2. The method according to claim 1, comprising consecutively repeating step (b) two or more times.

3. The method according to claim 1, comprising repeating step (a) at least one time.

4. The method according to claim 1, wherein the valuable metal sulfide further comprises cobalt sulfide (CoS) in a precipitated state.

5. The method according to claim 1, wherein step (b) comprises adding the sulfuric acid so as to have the pH of the solution be 4 to 5.

6. The method according to claim 5, wherein step (c) comprises adding the sulfuric acid to the residual solution from which the valuable metal sulfide is recovered so as to have a pH of 1 to 3.

7. The method according to claim 5, wherein step (c) comprises adding the sulfuric acid to the residual solution from which the valuable metal sulfide is recovered so as to have a pH of 1.5 to 2.

8. The method according to claim 1, further comprising, prior to removing iron and aluminum from the residual solution, extracting copper from a solution comprising cobalt, zinc, copper, and manganese to provide the residual solution, wherein the residual solution includes valuable metals of cobalt and zinc and impurities of copper and manganese.

9. A method for recovering a valuable metal sulfide, the method comprising:
    (a) removing iron and aluminum from a residual solution including a valuable metal by adding limestone to the residual solution, wherein the residual solution comprises cobalt and zinc, and wherein the residual solution including the valuable metal further includes impurities of copper and manganese;
    (b) recovering the valuable metal sulfide by adding sulfuric acid and sulfide to the residual solution from which the iron and the aluminum are removed; and
    (c) removing sulfur from the residual solution from which the valuable metal sulfide is recovered by adding sulfuric acid to the residual solution from which the valuable metal sulfide is recovered,
    wherein step (a) includes
        adding the limestone at a pulp density of 20% by weight to 30% by weight so as to have a pH of 5 to 6,
        removing the iron and aluminum at a temperature of 35° C. to 50° C. for 0.5 hours to 4 hours, and
        precipitating the iron in a solid state of $Fe_2(SO_4)_3$ and precipitating the aluminum in a solid state of $Al(OH)_3$,
    wherein the sulfide includes sodium sulfide ($Na_2S$) and sodium hydrogen sulfide (NaHS) added to seawater in an amount of 3 times to 10 times a total molar amount of the valuable metal so as to have a concentration of 2M dissolved sulfide,
    wherein the valuable metal sulfide comprises zinc sulfide (ZnS) in a precipitated state, and an average particle size (d 0.5) of the zinc sulfide (ZnS) is about 4.09 µm,
    wherein step (b) comprises adding the sulfuric acid so as to have a pH of the solution be 4 to 5.5, and then adding the sulfide, and
    wherein the sulfur removed in step (c) is in the form of hydrogen sulfide ($H_2S$).

10. The method according to claim 9, further comprising, prior to removing iron and aluminum from the residual solution, extracting copper from a solution comprising cobalt, zinc, copper, and manganese to provide the residual solution, wherein the residual solution includes valuable metals of cobalt and zinc and impurities of copper and manganese.

11. A method for recovering a valuable metal sulfide, the method comprising:
    (a) removing iron and aluminum from a residual solution including a valuable metal by adding limestone to the residual solution, wherein the residual solution comprises cobalt and zinc, and wherein the residual solution including the valuable metal further includes impurities of copper and manganese;
    (b) preparing sulfuric acid;
    (c) recovering the valuable metal sulfide by adding the sulfuric acid and sulfide to the residual solution from which the iron and the aluminum are removed; and
    (d) removing sulfur from the residual solution from which the valuable metal sulfide is recovered by adding sulfuric acid to the residual solution from which the valuable metal sulfide is recovered, wherein step (a) includes
adding the limestone at a pulp density of 20% by weight to 30% by weight so as to have a pH of 5 to 6,
removing the iron and aluminum at a temperature of 35° C. to 50° C. for 0.5 hours to 4 hours, and
precipitating the iron in a solid state of $Fe_2(SO_4)_3$ and precipitating the aluminum in a solid state of $Al(OH)_3$,
wherein the sulfide includes sodium sulfide ($Na_2S$) and sodium hydrogen sulfide (NaHS) added to seawater in an amount of 3 times to 10 times a total molar amount of the valuable metal so as to have a concentration of 2M dissolved sulfide, and
wherein the valuable metal sulfide comprises zinc sulfide (ZnS) in a precipitated state, and an average particle size (d 0.5) of the zinc sulfide (ZnS) is about 4.09 µm.

12. The method according to claim 11, wherein step (a) includes adding the limestone at a pulp density of 20% by weight to 30% by weight so as to have a pH of 5 to 6.

13. The method according to claim 11, wherein step (c) comprising adding the sulfuric acid so as to have a pH of the solution be 4 to 5.5, and then adding the sulfide.

14. The method according to claim 11, wherein
step (a) includes adding the limestone at a pulp density of 20% by weight to 30% by weight so as to have a pH of 5 to 6, and
step (c) comprises adding the sulfuric acid so as to have a pH of the solution be 4 to 5.5, and then adding the sulfide.

15. The method according to claim 11, further comprising, prior to removing iron and aluminum from the residual solution, extracting copper from a solution comprising cobalt, zinc, copper, and manganese to provide the residual solution, wherein the residual solution includes valuable metals of cobalt and zinc and impurities of copper and manganese.

\* \* \* \* \*